United States Patent

[11] 3,621,866

| [72] | Inventor | Joseph O. Thorsheim<br>Minneapolis, Minn. |
| --- | --- | --- |
| [21] | Appl. No. | 879,683 |
| [22] | Filed | Nov. 25, 1969 |
| [45] | Patented | Nov. 23, 1971 |
| [73] | Assignee | Honeywell Inc.<br>Minneapolis, Minn. |

[54] FLUID-MIXING SYSTEM
5 Claims, 2 Drawing Figs.

[52] U.S. Cl. .................................................. 137/100,
137/501, 137/606
[51] Int. Cl. ........................................................ G05d 11/00
[50] Field of Search .......................................... 137/7, 88,
100, 501, 506, 605, 606, 613

[56] References Cited
UNITED STATES PATENTS

| 1,452,265 | 4/1923 | Collins et al. ................ | 137/88 X |
| --- | --- | --- | --- |
| 2,707,964 | 5/1955 | Monroe ........................ | 137/7 X |
| 2,800,915 | 6/1957 | Tavener ....................... | 137/88 |
| 3,028,876 | 4/1962 | Gratzmuller ................. | 137/501 |
| 3,100,504 | 8/1963 | Kauer .......................... | 137/501 X |
| 3,172,254 | 3/1965 | Wright ......................... | 137/501 X |
| 3,233,987 | 2/1966 | Hepburn ...................... | 137/88 X |

*Primary Examiner*—Samuel B. Rothberg
*Assistant Examiner*—David J. Zobkiw
*Attorneys*—Lamont B. Koontz and Robert S. Craig ABSTRACT: A fluid-mixing system employs two flow rate regulators connected so that one of the regulators meters one of the fluids and the other regulator meters a mixture of the two fluids. In an exhaust gas analyzer that mixes a sample of exhaust gas with air prior to testing there is less fouling of the flow regulator handling the exhaust gas if mixing and consequent dilution occurs before passing through the metering orifice. Also, the orifice through which the mixture flows is considerably larger and therefore less subject to fouling.

PATENTED NOV 23 1971

3,621,866

FROM PROBE

CLEAN AIR

INVENTOR.
JOSEPH O. THORSHEIM
BY Robert S. Craig
ATTORNEY.

FLUID-MIXING SYSTEM

This invention relates to fluid flow control and more particularly to a fluid-mixing system especially useful in mixing small volumes of fluid where one of the fluids may be contaminated.

In one exhaust gas analyzer system exhaust gas and air are mixed in a predetermined ratio prior to being drawn into a chamber and burned to detect carbon monoxide. Flow rate of each of the two gases is regulated by maintaining a predetermined pressure drop across an orifice. Difficulty has been experienced with clogging of the orifice through which the exhaust gas passes. This problem becomes much less severe as the size of the orifice is increased. According to the invention the flow regulators are arranged so that one regulator controls airflow and the other flow regulator controls flow of the mixture of air and exhaust. The orifice of the second regulator is therefore larger making it less susceptible to clogging, and the dilution of the exhaust gas also reduces the tendency to fouling. Because flow rates are low and volume of gasses small in this system the resulting increase in orifice size produces a significant improvement in performance.

IN THE DRAWING

Figure 1:
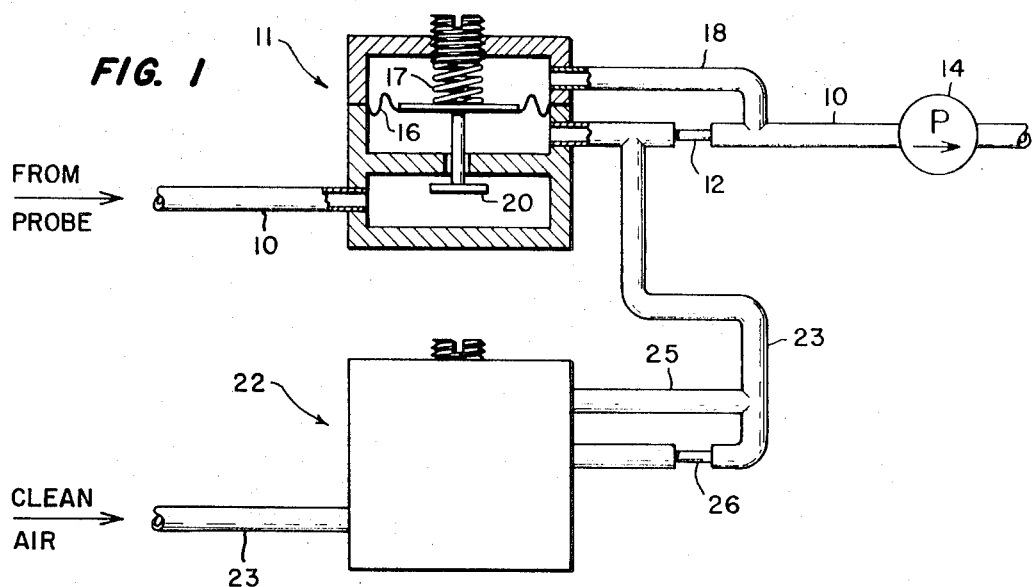
FIG. 1 is a schematic showing of one form of fluid-mixing systems.

Referring to FIG. 1, a pipeline or conduit 10 is employed to transmit fluid from a sampling probe (not shown) through a regulator 11, a restriction 12 to flow-inducing means in the form of a pump 14. The regulator 11 together with restriction 12 comprise a flow regulator. The restriction 12 is suitably in the form of an orifice.

The regulator 11 can be in the form of a pressure regulator in which the pressures on opposite sides of diaphragm 16 differ by the force supplied by an adjustable spring 17. A conduit 18 is connected to conduit 10 downstream of the restriction 12 and to the space above diaphragm 16 in regulator 11. A valve disk 20, connected to diaphragm 16, will be positioned to maintain a constant pressure drop across restriction 12, and therefore constant flow.

A second regulator 22, similar in all parts to regulator 11, is connected by a conduit 23 to conduit 10 upstream of the restriction 12. A conduit 25 is a pressure connection between the space above the diaphragm in regulator 22 and the conduit 23 downstream of a restriction 26 in conduit 23. The regulator 22 is so adjusted and restriction 26 so selected as to maintain a flow in conduit 23 somewhat less than in conduit 10. Thus the flow through regulator 11 will be the difference between the flow through restriction 12 and the flow through restriction 26.

In an actual embodiment of the invention, adjustment of regulator 11 to produce a pressure drop of 11.5 inches of water across a 0.060-inch diameter orifice (providing restriction 12) produced a flow of 5.250 liters of gas mixture per minute, while the regulator 22 was set to produce a pressure drop of 11.5 inches of water across a 0.040-inch diameter orifice (providing restriction 26) produced a 2.525-liter-per-minute flow through restriction 26. In this case a sample of exhaust gas entering regulator was diluted with an approximately equal volume of air before passing through restriction 12. The orifice providing restriction 12 was something over twice the area that would have been used if each gas stream were controlled separately in which case the two regulators would be connected in parallel, the gas then remixed further downstream.

Figure 2:
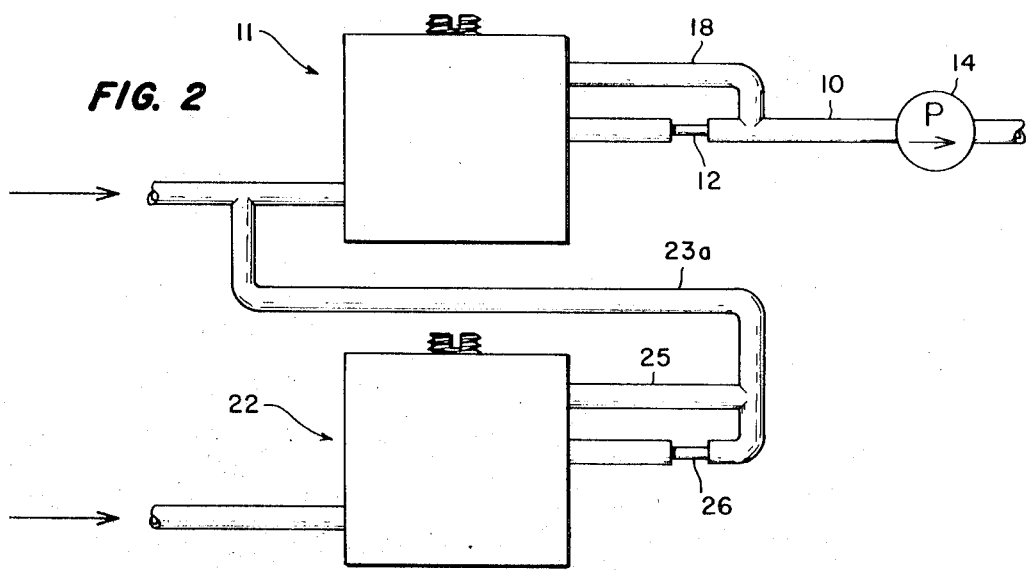
FIG. 2 is a schematic showing of a modified version of the fluid-mixing system.

A second embodiment of the invention is shown in FIG. 2. Here all the identified parts are the same as in FIG. 1 with the exception of the connection between regulator 22 and conduit 10. Here, a conduit 23a connects the output of regulator 22 to the input of regulator 11. The operation is the same as FIG. 1 except that the valve of regulator 11 must handle the total flow. The pressure drop across restriction 12 will represent flow of the gas mixture just as in FIG. 1, and the intake of contaminated gas will be the difference between the flows through restrictions 12 and 26.

While the invention has been illustrated by an arrangement intended to mix a sample of exhaust gas and air, obviously the same system could be used with any two fluids.

The embodiments of the invention in which an exclusive property or right is claimed are defined as follows:

1. Metering apparatus for use in mixing metered quantities of two fluids, the apparatus comprising;
    first flow regulator unit connected in a first conduit having first rate-responsive means responsive
    second flow regulator unit connected in a second conduit having second rate-responsive means responsive
    means adapted to supply a first fluid to said first flow regulator means,
    means adapted to supply a second fluid to said second flow regulator means, and
    means connecting said second flow regulator unit to supply the rate of flow in said second conduit to said first conduit to said first flow regulator unit in such a manner that the second fluid flows through said first rate-responsive means responsive to the rate of flow of said first flow regulator unit, said metering apparatus being further characterized in that said second predetermined rate of flow is less than said first predetermined rate of flow.

2. Metering apparatus in accordance with claim 1 in which each of the rate-responsive means responsive to rate of flow comprises restriction means.

3. Metering apparatus in accordance with claim 1 in which each of the rate-responsive means responsive to rate of flow comprises orifice means.

4. In fluid-mixing apparatus comprising, a first conduit, means for inducing fluid flow in said first conduit, a first restriction in said first conduit upstream of said flow-inducing means, a regulator in said first conduit upstream of said first restriction, a fluid connection between said regulator and a point in said conduit downstream of said first restriction to adjust said regulator to maintain a predetermined pressure drop across said first restriction, a second conduit connected to said first conduit upstream of said first restriction, and a constant flow rate control means including a second restriction and a regulating valve in said second conduit constructed to control flow in said second conduit at a lower rate than the flow through said first restriction.

5. Fluid-mixing apparatus comprising a first conduit, means for inducing fluid flow through said first conduit, first constant flow rate control means in said first conduit upstream from said flow-inducing means, a second conduit connected to said first conduit upstream of said first flow rate control means, and a second constant flow rate control means including a restriction and a regulating valve in said second conduit constructed to control flow in said second conduit at a lower rate than said first flow rate control means.

* * * * *